May 21, 1946.　　　W. BRADFORD　　　2,400,735

ELECTRICALLY HEATED BLANKET

Filed May 16, 1944

INVENTOR
WILLIAM BRADFORD
BY Chapin & Neal
ATTORNEYS

Patented May 21, 1946

2,400,735

UNITED STATES PATENT OFFICE 2,400,735

ELECTRICALLY HEATED BLANKET

William Bradford, Taunton, Mass.

Application May 16, 1944, Serial No. 535,843

3 Claims. (Cl. 219—46)

This invention relates to electrically heated blankets and has for its object to improve the control of blankets of this type in accordance with variations of the ambient temperature in the room.

Figure 1:
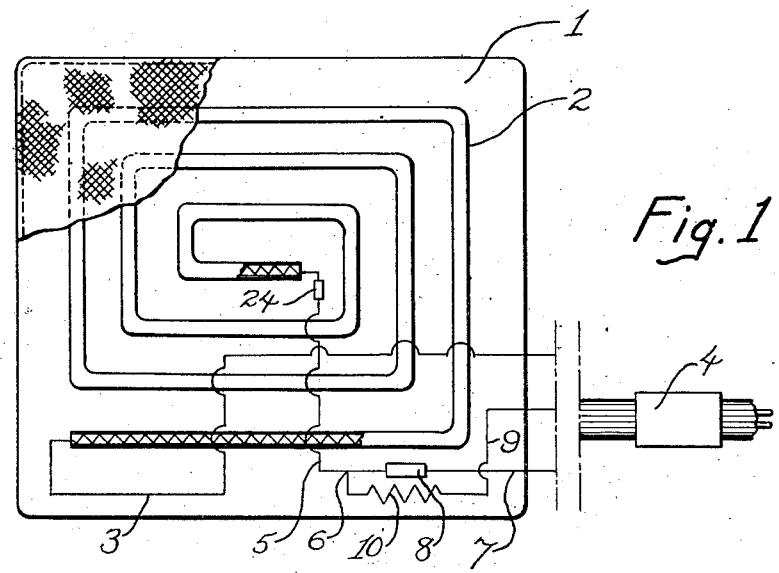
Figure 2:
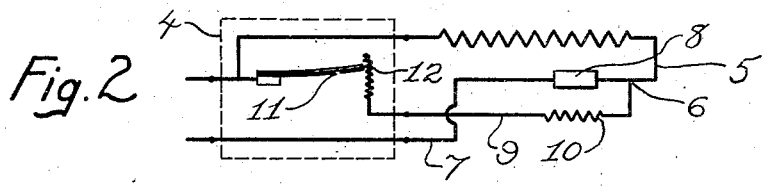
Figure 3:
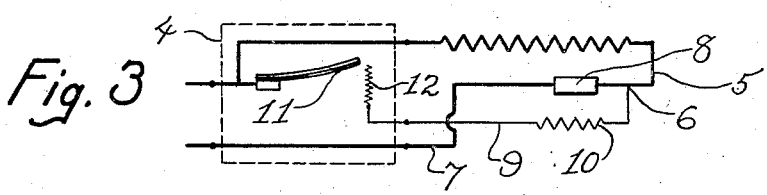
Figures 4, 5:
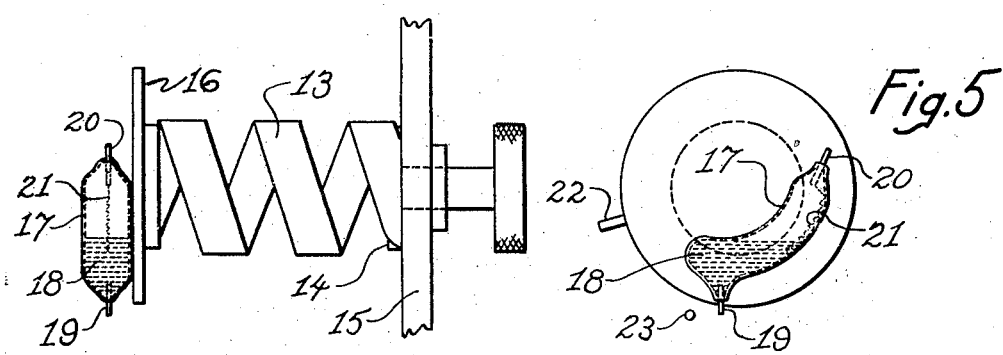

The control of a blanket is essentially distinct from that of the usual heating pad. A heating pad is designed to operate generally at one or more fixed heats, the control being in a manually operated switch which preselects the temperature to be maintained by one or more thermostats located in the pad itself. Such pads are used for local application of heat and are always intended for producing a sensation of warmth. An electrically heated blanket, on the contrary, should be regulated automatically to make up the heat loss from the patient by radiation and for this purpose should increase its heat output as the room temperature drops. In accordance with the present invention, a simple external control is provided by which the room temperature operates to control in infinite gradations the temperature at which the blanket itself operates. This invention will now be described in connection with the accompanying drawing, in which Fig. 1 is a diagrammatic view of the blanket involving the invention;

Figs. 2 and 3 are circuit diagrams illustrating the principles on which the blanket control operates; and Figs. 4 and 5 are respectively side and end views of a thermostat arrangement by which the external control may be maintained.

The blanket comprises a body 1 in which there is imbedded an electrically heating element 2, one end of this heating element being connected by a wire 3 to an external control box indicated at 4. The other end of the heating element is connected by a wire 5 to a branching point 6 from which one wire 7 passes to the control box through a thermostat 8 imbedded in the blanket and another wire 9 passes to the control box through a thermostat heating resistance 10.

The external control box contains a suitable temperature responsive device such as a bimetallic element indicated diagrammatically at 11 in Figs. 2 and 3. It also contains a resistance 12 in the line 9 which includes the thermostat heater 10. A contact point on the bimetallic element makes contact with the resistance 12 at a place determined by the bending of the element. The blanket control thermostat 8 is subject to the heating effects both of the main heating coil 2 and the thermostat heater 10. If the bimetallic element bends so as to make contact with the resistance 12 in such a manner as to include very little of this resistance in circuit with the thermostat heater 10 the latter will take a large proportion of the current, which divides between the heater 10 and the heating element 2. If the thermostat 11 deflects as in Fig. 3 so that no current passes through the resistance 12 or makes contact in such a manner that a large amount of this resistance is included in the wire, the current passing through the heater 10 will be zero or a small quantity. In the first case, the blanket thermostat 8 will be warmed rapidly by the auxiliary heater so that the thermostat will be opened before the blanket itself has warmed up to the temperature for which the thermostat 8 is set. This will produce a low heat condition of the blanket and the external thermostat will be adjusted so that this occurs at high room temperature. As the room temperature decreases, the bending of the bimetallic element will gradually include more and more of the resistance 12 in the auxiliary heater circuit. As the current through the auxiliary heater is thus decreased, the blanket thermostat 8 will be controlled more and more by the temperature of the blanket itself rather than the local influence of the heater 10. In the extreme case shown in Fig. 3, corresponding to very low room temperature, the heating coil 10 is out of circuit entirely and the blanket operates at the maximum temperature of which it is capable.

An alternative arrangement of an external thermostat is shown in Figs. 4 and 5. In this case a bimetallic strip 13 is wound in a helical form and is anchored at one end to an adjusting sleeve 14 turning in a bracket 15. The other end of the helix is fixed to a disk 16 upon which is mounted an evacuated insulating tube 17 preferably of curved form. The insulating tube contains a small amount of mercury 18 or other conducting liquid and has an electrode 19 at one end. A second electrode 20 is secured in the other end of the tube and is connected to a resistance wire 21 which extends along the outer curved side of the tube. If the thermostat helix turns the tube so that it lies substantially horizontal as viewed in Fig. 5, the mercury will make contact directly between the electrode 19 and the electrode 20. As the helix rotates the tube to the position of Fig. 5, the mercury will contact further down the resistance wire, causing a greater resistance to be included in the circuit and the current through the auxiliary heater coil 10 to be correspondingly reduced. As the helix turns the tube 17 still further, contact between the electrode 19 and the resistance wire 21 may if desired be entirely broken or this effect may be prevented by suitable stops 22, 23. The manner in which the form of thermostat just described controls the pad temperature is exactly the same as that described in connection with Figs. 2 and 3.

I claim:

1. An electrically heated blanket comprising a main heating coil embedded in the blanket, a thermostat in series with the blanket and embedded in the blanket in position to be heated by said coil, an auxiliary thermostat heater connected in shunt with the main coil and embedded in the blanket in position to supply heat to the thermostat, a resistance external to the blanket and connected in series with the auxiliary heater, and heat responsive means external to the blanket and operating to vary said resistance inversely with the ambient temperature.

2. An electrically heated blanket comprising a main heating coil embedded in the blanket, a thermostat in series with the blanket and embedded in the blanket in position to be heated by said coil, an auxiliary thermostat heater connected in shunt with the main coil and embedded in the blanket in position to supply heat to the thermostat, a resistance external to the blanket and connected in series with the auxiliary heater, a contact movable along the resistance, and heat responsive means external to the blanket and moving the contact to increase the resistance included in series with said thermostat as the ambient temperature drops.

3. An electrically heated blanket comprising a main heating coil embedded in the blanket, a thermostat in series with the blanket and embedded in the blanket in position to be heated by said coil, an auxiliary thermostat heater connected in shunt with the main coil and embedded in the blanket in position to supply heat to the thermostat, a bimetallic helix external to the blanket, an insulating tube, an electrode in the tube, a resistance element located along the length of the tube, an electrically conducting liquid within the tube, the electrode, liquid, and resistance element being connected in series with the auxiliary heater, and a connection between the helix and the tube to tilt the tube to increase the length of resistance element included in the circuit as the ambient temperature drops.

WILLIAM BRADFORD.